(12) United States Patent
Nakano et al.

(10) Patent No.: US 10,907,999 B2
(45) Date of Patent: Feb. 2, 2021

(54) GAS SENSOR DEVICE

(71) Applicant: Hitachi Automotive Systems, Ltd., Hitachinaka (JP)

(72) Inventors: Hiroshi Nakano, Tokyo (JP); Masahiro Matsumoto, Tokyo (JP); Yasuo Onose, Hitachinaka (JP); Yoshimitsu Yanagawa, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 76 days.

(21) Appl. No.: 15/741,943

(22) PCT Filed: Jul. 27, 2016

(86) PCT No.: PCT/JP2016/071946
§ 371 (c)(1),
(2) Date: Jan. 4, 2018

(87) PCT Pub. No.: WO2017/038313
PCT Pub. Date: Mar. 9, 2017

(65) Prior Publication Data
US 2018/0188088 A1    Jul. 5, 2018

(30) Foreign Application Priority Data
Aug. 31, 2015    (JP) .................... 2015-169976

(51) Int. Cl.
*G01D 11/24*    (2006.01)
*G01N 25/18*    (2006.01)
(Continued)

(52) U.S. Cl.
CPC .......... *G01D 11/245* (2013.01); *G01F 1/696* (2013.01); *G01N 25/18* (2013.01); *G01N 27/18* (2013.01); *F02M 35/1038* (2013.01)

(58) Field of Classification Search
CPC ........ G01F 1/696; G01N 27/18; G01N 25/18; F02M 35/1038; G01D 11/245
(Continued)

(56) References Cited

U.S. PATENT DOCUMENTS 6,322,247 B1    11/2001    Bonne et al.
2005/0006236 A1*    1/2005    Kim .................... G01N 27/18
                                                                  204/415
(Continued)

FOREIGN PATENT DOCUMENTS

JP    59-170260 U    11/1984
JP    8-5597 A    1/1996
(Continued)

OTHER PUBLICATIONS

Extended European Search Report issued in counterpart European Application No. 16841345.8 dated Apr. 5, 2019 (seven pages).
(Continued)

*Primary Examiner* — Marrit Eyassu
(74) *Attorney, Agent, or Firm* — Crowell & Moring LLP

(57) ABSTRACT

To provide a gas sensor device having improved measurement accuracy. This gas sensor device is provided with: a sensor element that detects the concentration of a gas by means of heat dissipation from a heat generating body; and a cover with which the sensor element is covered. The cover has a plurality of ventilation sections, which are disposed by being separated with each other in the direction perpendicular to the flowing direction of the gas, and the sensor element is disposed between the ventilation sections.

10 Claims, 14 Drawing Sheets

(51) Int. Cl.
*G01N 27/18* (2006.01)
*G01F 1/696* (2006.01)
*F02M 35/10* (2006.01)

(58) Field of Classification Search
USPC .......................................................... 73/23.2
See application file for complete search history.

(56) References Cited

U.S. PATENT DOCUMENTS

| | | | |
|---|---|---|---|
| 2005/0025215 A1* | 2/2005 | Arndt ..................... | G01N 25/18 374/44 |
| 2005/0228596 A1* | 10/2005 | Shoji ..................... | G01N 27/18 702/24 |
| 2011/0226039 A1 | 9/2011 | Roland et al. | |
| 2015/0101394 A1* | 4/2015 | Fujita ................. | G01N 27/4077 73/23.31 |
| 2015/0226688 A1* | 8/2015 | Watanabe .............. | G01N 27/18 73/31.05 |
| 2016/0139071 A1 | 5/2016 | Nakano et al. | |

FOREIGN PATENT DOCUMENTS

| | | | |
|---|---|---|---|
| JP | 9-5277 | A | 1/1997 |
| JP | 2003-506703 | A | 2/2003 |
| JP | 2010-54355 | A | 3/2010 |
| JP | 2014-81367 | A | 5/2014 |
| JP | 2014081367 | A * | 5/2014 |
| JP | 2015-4609 | A | 1/2015 |

OTHER PUBLICATIONS

International Search Report (PCT/ISA/210) issued in PCT Application No. PCT/JP2016/071946 dated Nov. 1, 2016 with English-language translation (Four (4) pages).
Japanese-language Written Opinion (PCT/ISA/237) issued in PCT Application No. PCT/JP2016/071946 dated Nov. 1, 2016 (Four (4) pages).
Japanese-language Office Action issued in counterpart Japanese Application No. 2015169976 dated Feb. 19, 2019 with English translation (five (5) pages).

* cited by examiner

GAS SENSOR DEVICE

TECHNICAL FIELD

The present invention relates to a gas sensor device provided with a sensor element for detecting gas concentration.

BACKGROUND ART

Gas sensor devices that measure environmental characteristics such gas concentration are used in various technical fields. For example, in internal combustion engines for automobiles, in order to reduce fuel consumption, gas sensor devices measure the humidity, pressure, and temperature of intake air and control an optimal fuel injection amount. Furthermore, in order to optimally operate the internal combustion engines, it is required to measure environmental parameters with high accuracy, such as humidity and oxygen concentration.

As such a sensor device, in a sensor device described in PTL 1, in order to protect a sensor element, a first hollow portion formed in a housing of the sensor device and communicating with an intake air passage and a second hollow portion communicating with the first hollow portion are provided, and the sensor element is accommodated in the second hollow portion. Thus, the sensor element is configured not to be directly exposed to airflow. This configuration reduces influence by the airflow, and suppresses a dust-proof effect and the destruction of the sensor element due to the collision of particles.

Additionally, in PTL 2, a lid member that covers the sensor element is provided, an introduction hole is provided in the lid member, and the introduction hole is arranged so that gas to be measured does not directly blow onto the sensor element.

CITATION LIST

Patent Literature

PTL 1: JP 2015-4609 A
PTL 2: JP 2014-81367 A

SUMMARY OF INVENTION

Technical Problem

For example, a gas sensor device that measures the environment of an intake air passage of an internal combustion engine needs to measure the amount of gas in real time. Therefore, it is desired for the gas sensor device to make a high-speed response. In order to achieve the high-speed response, it is desirable that the sensor element is exposed to the intake air passage. However, when the sensor element is exposed to the intake air passage, intake air flows at a high speed due to the high rotation operation of the internal combustion engine, and the intake air that flows at a high speed adversely affects the measurement of gas. Additionally, particles such as particles of oil, dust, carbon and water droplets contained in the intake air passage of the internal combustion engine fly and adhere to the sensor element, and measurement accuracy is impaired.

In the sensor device that measures the concentration of gas in PTL 1, the effect of protecting the sensor element can be obtained. However, time required for a change in gas concentration to reach the sensor element from the intake air passage is delayed. Additionally, although in PTL 2, a speed is faster than a speed in PTL 1, gas to be measured flows into a lid member, and a gas sensor device is insufficient for highly accurate measurement. Therefore, it is difficult to use the sensor devices in an internal combustion engine where highly accurate measurement is desired in a wide flow rate range in which the gas to be measured flows at low to high speeds.

It is an object of the present invention to provide a gas sensor device with improved measurement accuracy.

Solution to Problem

In order to solve the above problems, the gas sensor device according to the present invention includes a sensor element that detects gas concentration by heat dissipation of a heating element and a cover covering the sensor element. The cover has a plurality of ventilation portions. The ventilation portions are arranged while being apart from each other in a direction perpendicular to a flow direction of the gas and the sensor element is arranged between the plurality of ventilation portions.

Advantageous Effects of Invention

According to the present invention, it is possible to provide a gas sensor device with improved measurement accuracy.

DESCRIPTION OF EMBODIMENTS

Hereinafter, exemplary embodiments of the present invention will be described in detail with reference to the drawings.

First Embodiment

Figure 1:
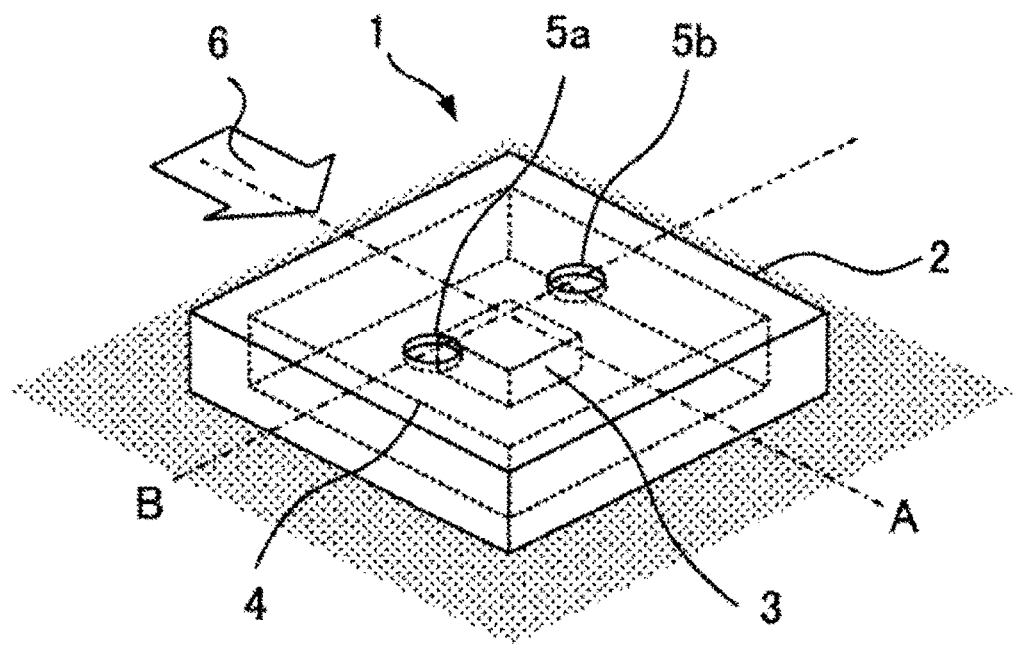
FIG. 1 is a perspective view illustrating a structure of a gas sensor device as one embodiment of the present invention.
Figure 2:
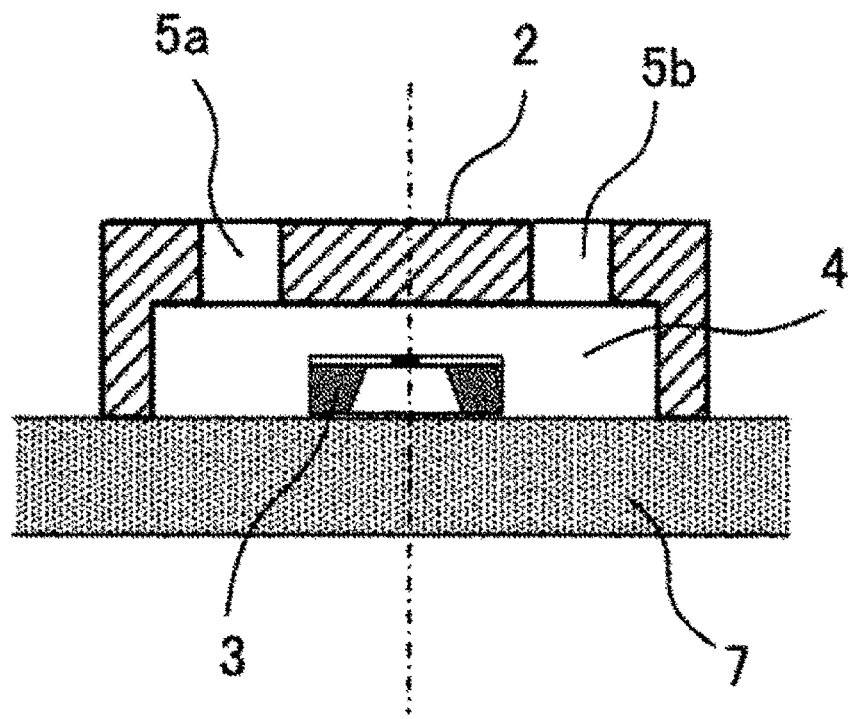
FIG. 2 is a cross-sectional view of a package illustrated in FIG. 1.
Figure 3:
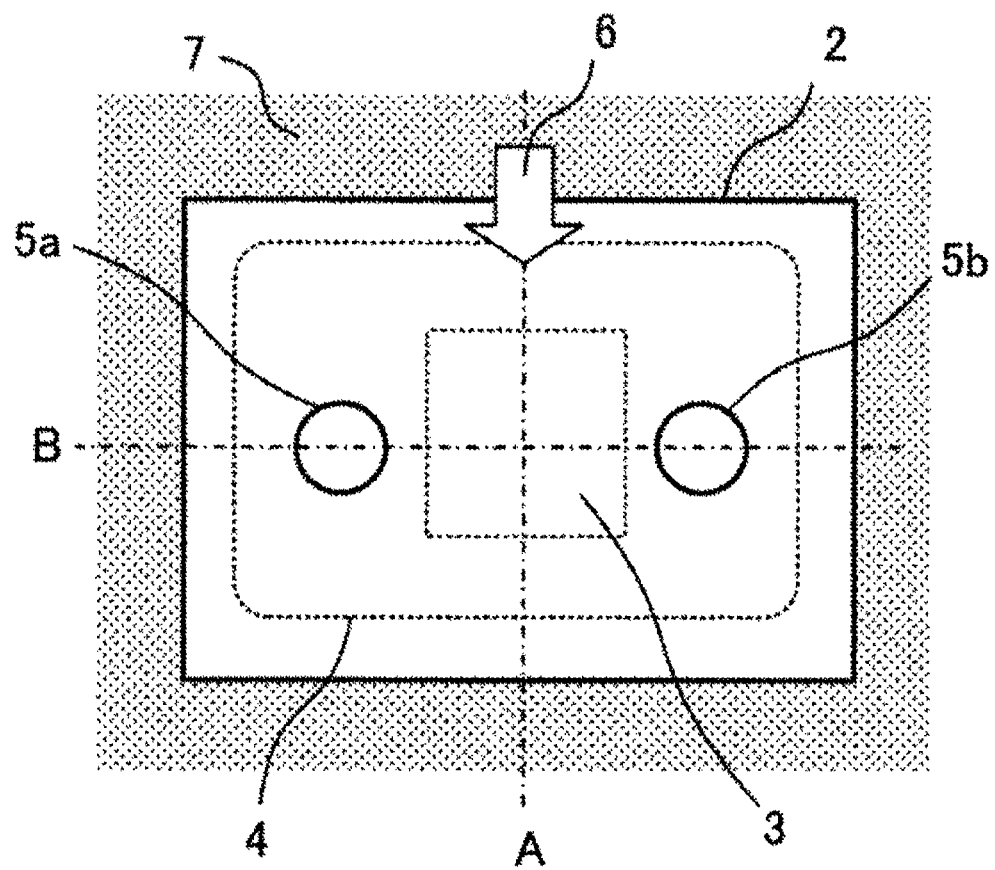
FIG. 3 is a top view of the package illustrated in FIG. 1.

One embodiment of a gas sensor device according to the present invention will be described with reference to FIGS. 1 to 3. FIG. 1 is a perspective view illustrating the gas sensor device as the one embodiment of the present invention, and FIG. 2 is a cross-sectional view of the gas sensor device in FIG. 1, taken along line A. Additionally, FIG. 3 is a plan view of the gas sensor device illustrated in FIG. 1, as viewed from above.

The gas sensor device 1 is installed, for example, in an intake air passage of an internal combustion engine and detects the humidity of gas flowing in the intake air passage. In a cover 2 of the gas sensor device 1, for example, there is provided an internal space 4 in which a sensor element 3 that detects the humidity of the gas is installed. When the sensor element 3 is exposed, dust, oil, water and the like contained in intake air collides with or adheres to the sensor element 3 and measurement accuracy is impaired. Therefore, the sensor element 3 is protected by the cover 2. For example, the sensor element 3 is a thermal humidity sensor element that measures the humidity on the basis of a change in an amount of heat dissipated from a heated resistor into the atmosphere, utilizing a change in the thermal conductivity of air due to an increase and decrease in the humidity. Details of the thermal humidity sensor element will be described later.

The cover 2 is provided with a plurality of ventilation portions 5a and 5b penetrating the outside of the cover 2 and the inside of the cover 2. The ventilation portions 5a and 5b are provided to allow the moisture of the intake air to be measured to enter and leave the inside of the cover 2. Then, on the outside of the cover 2, gas flows along the outer surface of the cover 2 in which the ventilation portions 5a and 5b are formed. That is, the cover 2 is installed so as to be inclined or parallel to a direction in which the gas flows. Furthermore, in other words, the opening direction (penetrating direction) of the ventilation portions 5a and 5b is oriented so as to intersect the flow of an air current 6. As a result, it is possible to reduce the inflow of pollutant substances coming flying simultaneously with the air current 6. Additionally, the above configuration reduces the inflow of airflow caused by dynamic pressure such as flow collision. Furthermore, the positions of the ventilation portions 5a and 5b are formed so as to be spaced apart from each other in a direction intersecting (more preferably, direction perpendicular to) the flowing direction of the air current 6 (A line direction). More preferably, a distance between the ventilation portions 5a and 5b is arranged so as to be larger than a width (width in a B line direction) of the sensor element 3.

FIG. 2 is a cross-sectional view of the gas sensor device taken along line B in FIG. 1. The sensor element 3 is directly or indirectly supported by a base material 7. For the sensor element 3, at least the facing side of the sensor element is covered with the cover 2. On a side of the cover 2 facing the sensor element 3, a plurality of ventilation portions 5a and 5b are formed. In the present embodiment, the base material 7 and the cover 2 are illustrated as separate bodies. However, the base material 7 and the cover 2 may be integrally formed. Additionally, adhesive and the like for fixing each member are not illustrated in the figure.

FIG. 3 is a plan view of the gas sensor device illustrated in FIG. 1, as viewed from above. A broken line in the figure illustrates an internal structure of the cover. The ventilation portions 5a and 5b are arranged while being close to a direction apart from each other from a line passing over the sensor element in the gas flow direction (A line). Additionally, the internal space 4 of the cover 2 has a substantially rectangular shape or a horizontally long shape, and a size of the internal space 4 in the gas flow direction (A line direction) is narrower than a width of the internal space 4 in the direction perpendicular to the flow (B line direction). As a result, the volume of the inside of the cover 2 is reduced, and time until external moisture diffuses and fills the inside of the cover 2 via the ventilation portions 5a and 5b is shortened.

Figure 4:
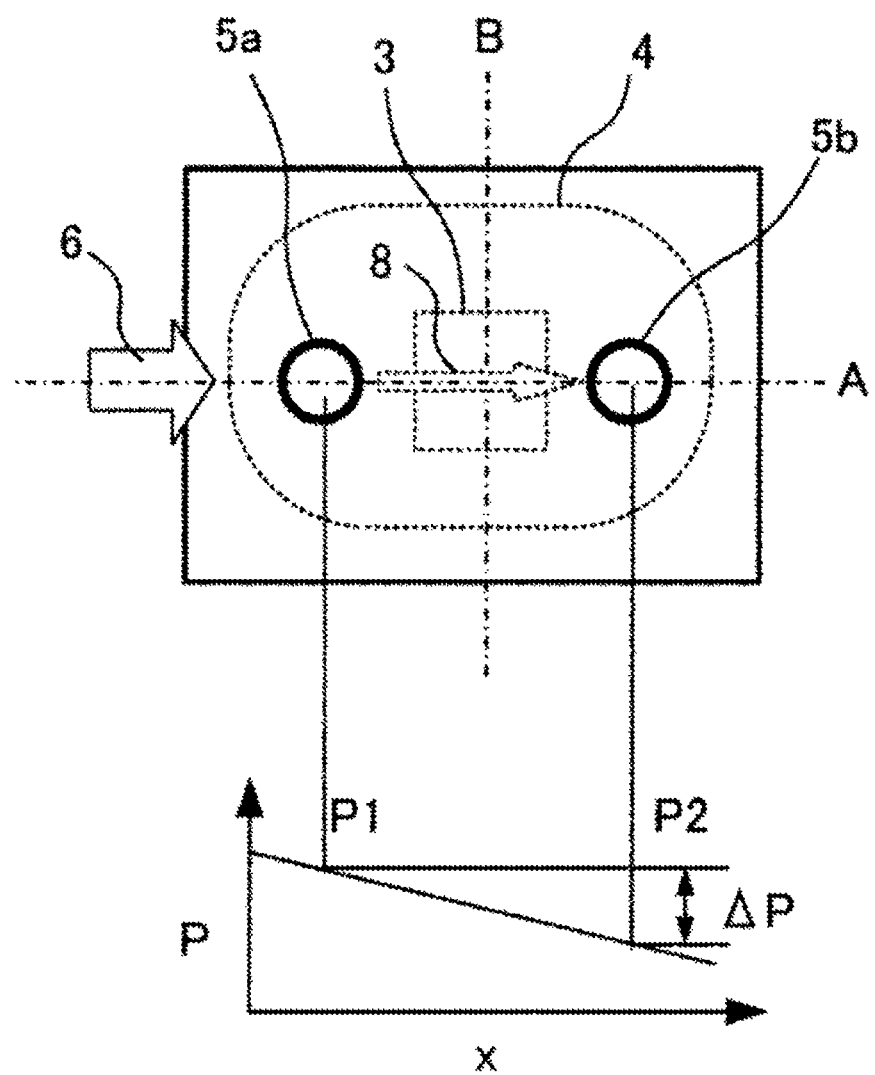
FIG. 4 is a view for describing actions and effects of the gas sensor device illustrated in the one embodiment.
Figure 5:
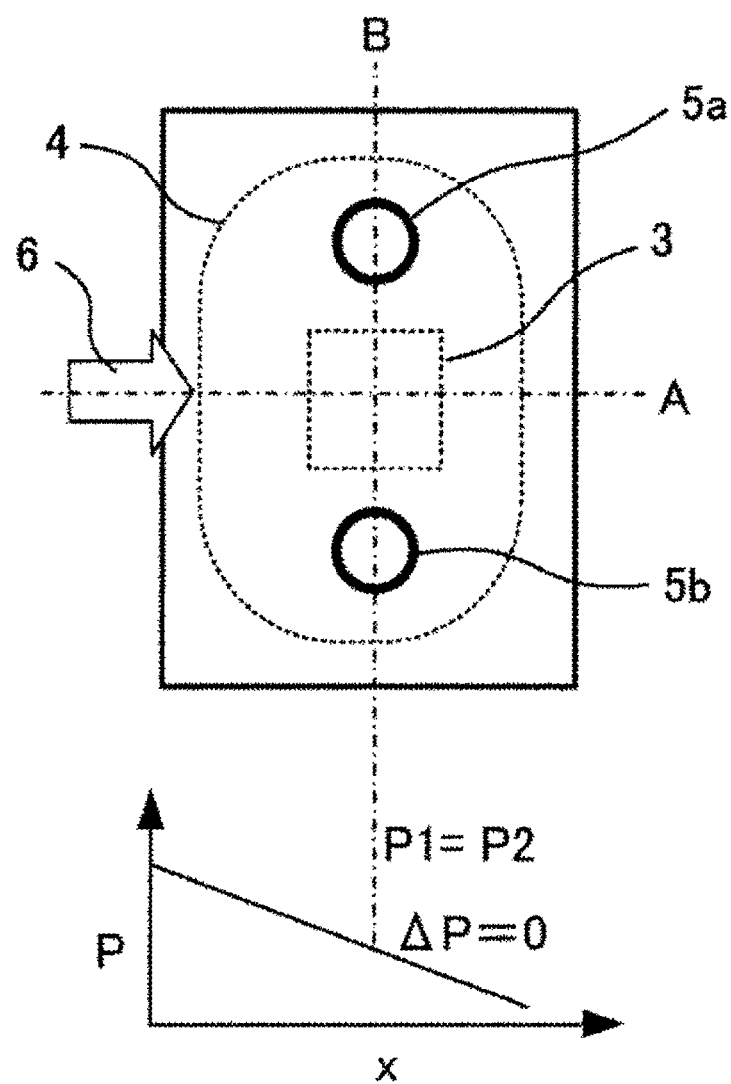
FIG. 5 is a view for describing actions and effects of the gas sensor device illustrated in the one embodiment.

Next, actions and effects of the above present embodiment will be described. FIGS. 4 and 5 are diagrams for describing actions and effects of the gas sensor device 1 illustrated in the above embodiment. An example illustrated in FIG. 4 and an example illustrated in FIG. 5 are different from each other in the arrangement direction of the ventilation portions 5a and 5b, and differences in arrangements of the ventilation portions 5a and 5b will be described. FIG. 4 is a view illustrating a structure in which ventilation portions 5a and 5b are arranged along a flow direction of the air current 6. The sensor element 3 is positioned at a position that is inside the cover 2 and between the ventilation portions 5a and 5b. When air flows in such an arrangement, a pressure gradient P (static pressure) along the flow direction occurs. Pressure is high on the upstream side of flow and pressure is low on the downstream side. Therefore, a pressure P1 of the ventilation portion 5a on the upstream side increases and a pressure P2 of the ventilation portion 5b on the downstream side decreases. Since a pressure difference ΔP between the ventilation portion 5a and the ventilation portion 5b occurs, an internal flow 8 occurs inside the cover 2. Since the sensor element 3 is arranged between the ventilation portions 5a and 5b, the sensor element 3 is susceptible to flow influences.

FIG. 5 is a view illustrating a structure in which the ventilation portions 5a and 5b are arranged while being apart from each other in a direction that is along the flow direction of the air current 6 and intersects from a line passing over the sensor element 3 (B line direction). In such an arrangement, when air flows, the pressure gradient P (static pressure) occurs along the flow direction. The pressure is high on the upstream side of the flow and the pressure is low on the downstream side. Since the ventilation portion 5a and the ventilation portion 5b are arranged so as to be almost the same or close to each other with respect to the flow direction, the pressure P1 of the ventilation portion 5a is almost equal to the pressure P2 of the ventilation portion 5b on the downstream side. Therefore, the pressure difference ΔP between the ventilation portion 5a and the ventilation portion 5b is reduced, and the flow inside the cover 2 can be suppressed. Additionally, even if the sensor element 3 is arranged between the ventilation portions 5a and 5b, the flow is suppressed. Therefore, it is possible to perform favorable measurement, and it is possible to provide a gas sensor device with improved measurement accuracy.

Figure 6:
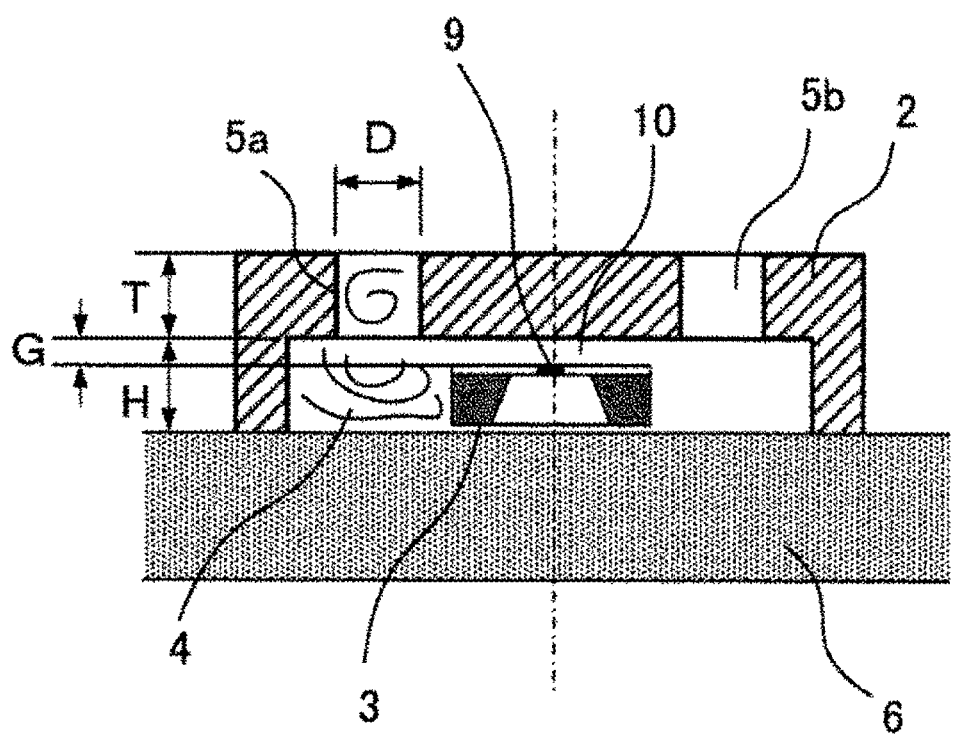
FIG. 6 is a view for describing actions and effects of the gas sensor device illustrated in the one embodiment.

FIG. 6 is a diagram for describing a configuration for obtaining more effective actions and effects of the gas sensor device 1 illustrated in the one embodiment described above.

The present embodiment is configured so that the pressure difference between the ventilation portions 5a and 5b formed on both sides of the sensor element 3 so as to face each other is reduced and no internal flow occurs. In order to further improve the accuracy, it is necessary to suppress the occurrence of noise due to the turbulence of the flow. In particular, when air flows, a wraparound (vortex) of the flow occurs in the ventilation portion 5a. Herein, as illustrated in FIG. 6, the ventilation portion 5a is formed so that T>D is satisfied when the diameter of the ventilation portion 5a provided in the cover 2 is defined as a D and the thickness of the ventilation portion 5a is defined as a T. As a result, the vortex formed by the wraparound of the flow can stay within the ventilation portion 5a.

Additionally, when the vortex occurs in the ventilation portion 5a, in the internal space 4 just below the ventilation portion 5a, the air is pulled by the viscosity of the air and the air flows. In order to reduce this flow in the internal space 4, it is effective to make the volume of the internal space 4 sufficiently larger than the size of the ventilation portion 5a. However, when the volume of the internal space 4 is made large, the humidity change of the internal space 4 is delayed, and responsiveness to humidity change is impaired. It is also effective to narrow the diameter D of the ventilation portion 5a. However, this narrowing of the diameter D also slows the humidity change of the internal space 4.

Therefore, in the present embodiment, air movement is suppressed and the responsiveness is ensured by the following configuration in which a volume change is provided in a path from the ventilation portion 5a to a detection portion 9 of the sensor element 3.

In the path from the ventilation portion 5a to the detection portion 9 of the sensor element 3, the volume change changes depending on the dimensions of D, H and G illustrated in FIG. 6. The path to the detection portion 9 is constricted by a size D of the ventilation portion 5a, is expanded by a height H of the internal space 4, and is narrowed further by a gap G. By configuring to satisfy D<H, the volume is expanded by the internal space 4. Therefore, the air movement is reduced. By further narrowing the gap G to satisfy G<H, ventilation resistance increases and the transmission of the air movement can be suppressed. In order to be more effective, by configuring to satisfy D>G, the volume change in the path can be increased. Therefore, the present embodiment is effective. The same applies to the ventilation hole 5b.

With the configuration in which the gap G is narrowed as described above, the air movement on the surface of the sensor element 3 can be stabilized, and the distance from the ventilation portion 5a to the detection portion 9 hardly changes. Therefore, a diffusion distance of the moisture can be kept short, and the responsiveness is not impaired.

In the one embodiment described above, a sensor element that involves heat generation and measures the amount of gas will be described as a sensor element with which more effect can be obtained. In sensor elements using heat generation, heat dissipation occurs due to the air movement. A micro-electro-mechanical system (MEMS) thermal humidity sensor in which such air movement is adversely affected will be described.

Figure 7:
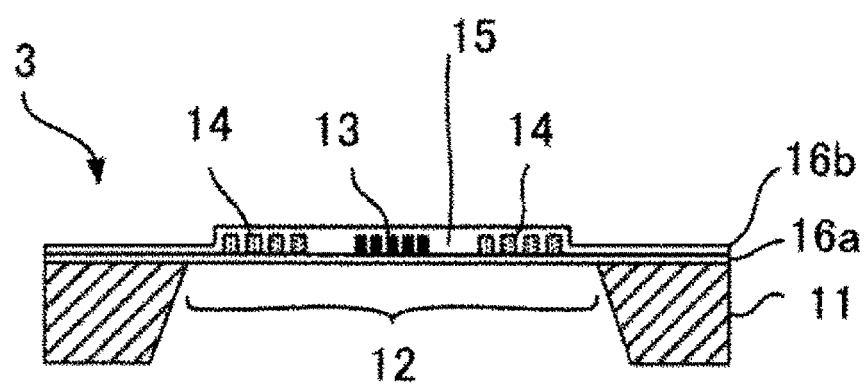
FIG. 7 is a cross-sectional view of a sensor element as an embodiment of the present invention.
Figure 8:
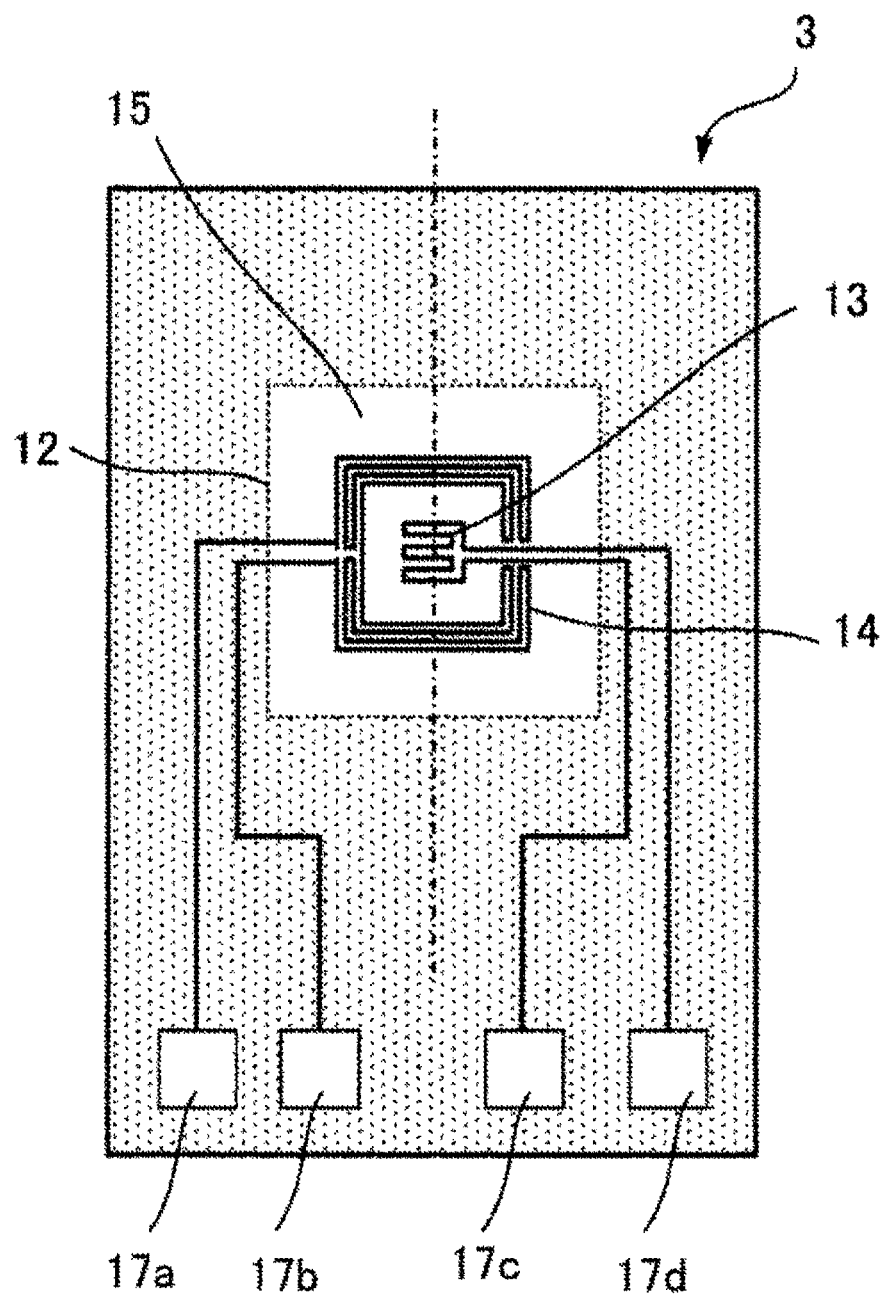
FIG. 8 is a plan view of the sensor element as the embodiment of the present invention.

An example of the sensor element 3 as a thermal humidity sensor will be described with reference to FIGS. 7 and 8. FIG. 7 is a cross section illustrating the sensor element 3, and FIG. 8 is a plane illustrating the sensor element 3.

The sensor element 3 includes a substrate 11 formed of single crystal silicon. A hollow portion 12 is formed in the substrate 11, and the first heating element 13 and the second heating element 14 are laid on the hollow portion 12. Additionally, a thin film support 15 supporting these heating elements is formed so as to be positioned on the hollow portion 12 of the substrate 11.

Herein, the thin film support 15 includes insulating layers 16a and 16b laminated on the upper surface of a substrate 2, and heating elements 13 and 14 are interposed and supported between the insulating layers 16a and 16b. The heating element 14 is arranged so as to surround the periphery of the heating element 13.

The heating element 13 dissipates heat by heat transfer to air. Since the heat conductivity of air changes depending on humidity and the amount of heat dissipated changes, a signal corresponding to the humidity can be obtained by measuring a voltage value or a current value based on the heat dissipation amount of the heating element 13. Arranging the heating element 14 produces an effect of maintaining the ambient temperature of the heating element 13 at the temperature of the heating element 14, and the dependence of the ambient temperature can be compensated.

FIG. 8 is a plan view illustrating the sensor element 3. The heating elements 13 and 14 are formed of resistors having fine widths, extending along the plane of the thin film support 15 and having a plurality of folded portions. Electrodes 7a, 7b, 7c, and 7d are formed in the sensor element 3 for connection with a drive circuit (not illustrated).

For the heating elements 13 and 14, for example, platinum (Pt), tantalum (Ta), molybdenum (Mo), and silicon (Si) are selected as materials stable at high temperature (materials having high melting points). As the insulating layers 16a and 16b, a single layer or a laminated configuration of silicon oxide ($SiO_2$) and silicon nitride ($Si_3N_4$) is selected. In addition, as the insulating layers 16a and 16b, it is possible to select a single layer or a laminated configuration made of resin materials such as polyimide, ceramics and glass. In addition, for the electrodes 7a, 7b, 7c, and 7d, aluminum (Al), gold (Au) or the like is selected.

The sensor element 3 is formed by using a semiconductor microfabrication technology utilizing photolithography and an anisotropic etching technique. The hollow portion 12 is formed by anisotropically etching the substrate 11.

Such a MEMS thermal humidity sensor detects that the thermal conductivity of air changes according to humidity on the basis of the amount of heat dissipated from the heating element. Therefore, when the MEMS thermal humidity sensor is arranged in the flow of air, heat dissipation changes due to the airflow, and as a result the humidity cannot be measured satisfactorily. Therefore, it is necessary to reduce the air movement around the sensor element. The reduction in the air movement around the sensor element is particularly important when the MEMS thermal humidity sensor is installed in the intake air passage of the internal combustion engine because the flow speed of air in the intake air passage changes greatly depending on the operating condition of the internal combustion engine.

Additionally, since the sensor element 3 is of the MEMS type, the heat capacity of the detection portion can be made small and the responsiveness is improved. However, since the heat capacity is small, the occurrence of noise due to minute air movement increases. Therefore, it is more important to reduce air movement around the sensor element.

Second Embodiment

Figure 9:
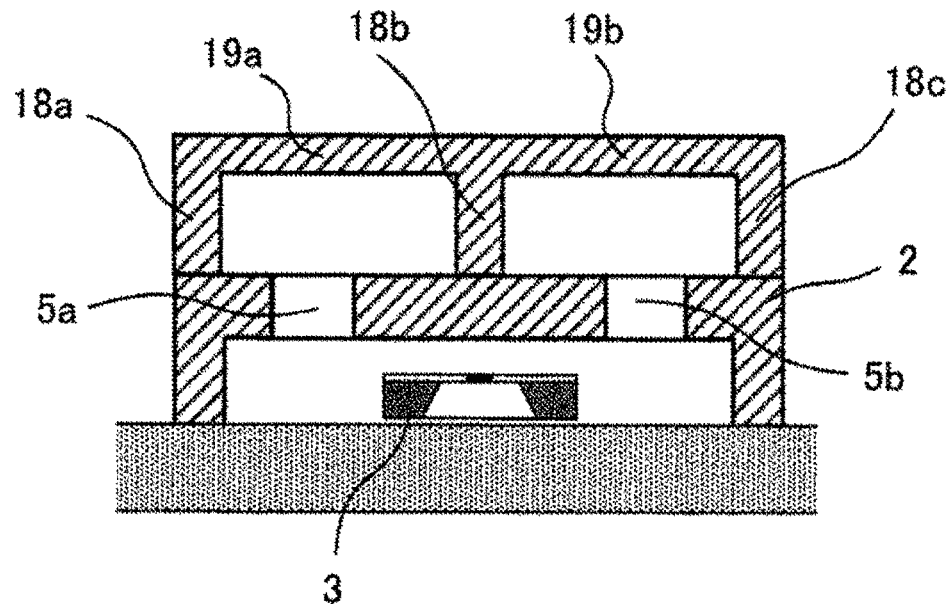
FIG. 9 is a cross-sectional view illustrating a structure of the gas sensor device as one embodiment of the present invention.

A more effective embodiment formed by applying the present invention will be described. The second embodiment illustrated in FIG. 9 is different from the first embodiment in that rectifying members 18a, 18b, and 18c that rectify airflow are provided outside a cover 2.

In the first embodiment, the ventilation portions 5a and 5b are arranged so as to be away from each other in a direction perpendicular from a line passing over the sensor element in the gas flow direction (A line). This configuration is effective when the flow direction of the gas is stable. However, when the flow direction is inclined, the positions of the ventilation portions 5a and 5b with respect to the flow direction low change and therefore a pressure difference occurs. As a result, airflow occurs inside the cover 2. In order to suppress the airflow inside the cover more effectively under various conditions, there is provided a guide member that rectifies the flow direction of a cover surface in which the ventilation portions are formed. As illustrated in FIG. 9, the shape of the guide member is a passage structure formed by guide members 18a, 18b, and 18c and shielding members 19a and, 19b and penetrating in the flow direction. The shielding members 19a and 19b are provided so that ventilation portions 5a and 5b are hidden as seen from the upper surface of the cover 2. As a result, the airflow inside the cover can be suppressed. Therefore, it is possible to perform favorable measurement, and it is possible to provide a gas sensor device with improved measurement accuracy.

Figure 10:
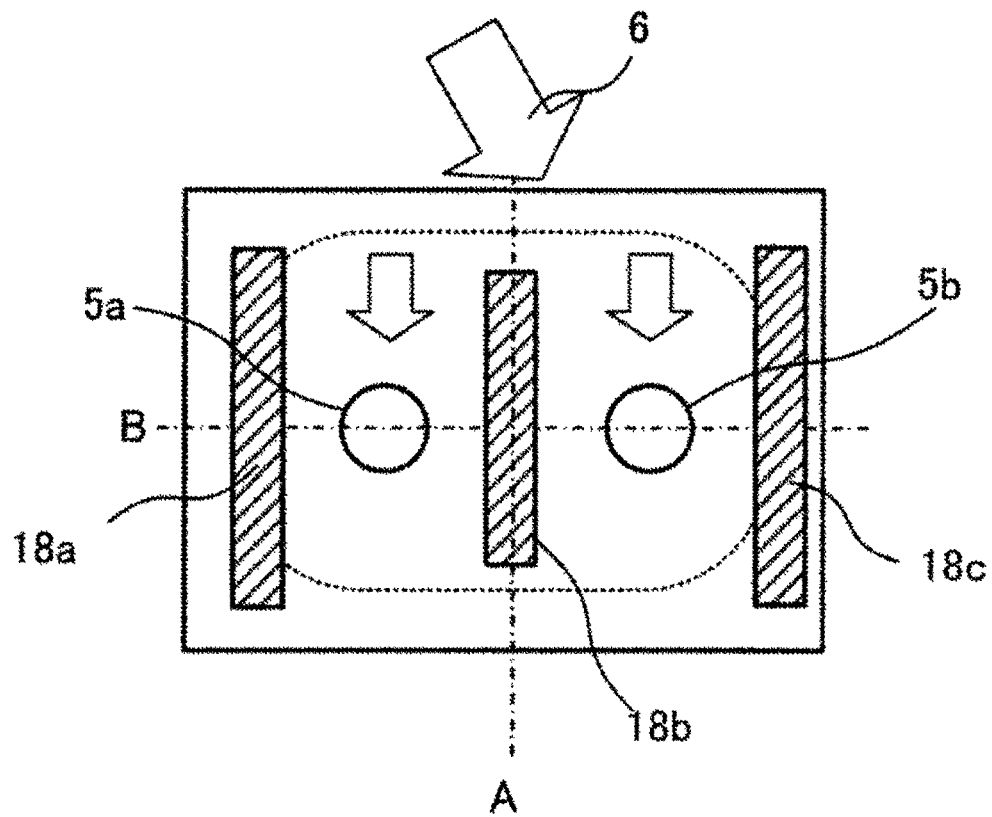
FIG. 10 is a plan view illustrating a structure of the gas sensor device as the one embodiment of the present invention.

As a more preferable structure of the rectifying structure, as illustrated in FIG. 10, rectifying structures provided in the ventilation portion 5a and the ventilation portion 5b are bilaterally symmetrical. As a result, a flow on the ventilation portion 5a and a flow on the ventilation portion 5b are substantially equalized to each other to reduce the pressure difference between the ventilation portion 5a and the ventilation portion 5b. As a result, since the flow inside the cover can be further suppressed. Therefore, it is possible to perform favorable measurement, and it is possible to provide a gas sensor device with improved measurement accuracy.

Third Embodiment

Figure 11:
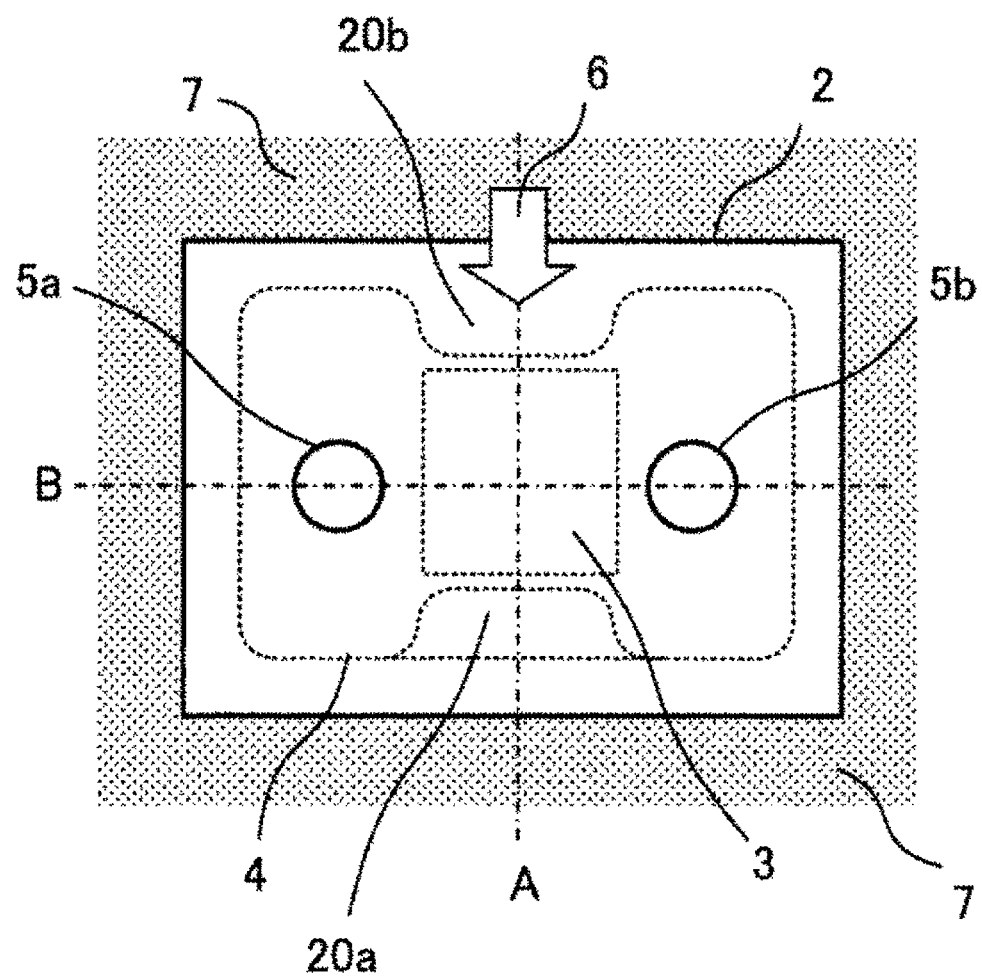
FIG. 11 is a plan view illustrating the structure of the gas sensor device as one embodiment of the present invention.

A more effective embodiment formed by applying the present invention will be described. FIG. 11 is a view illustrating a gas sensor device according to a third embodiment of the present invention. The embodiment in FIG. 11 is different from the first embodiment in that throttle members 20a and 20b are provided in an internal space 4 of a cover 2.

In the gas sensor device according to the first embodiment, the forming positions of a ventilation portion 5a and a ventilation portion 5b with respect to the flow direction of air change due to a variation in manufacturing when the ventilation portion 5a and the ventilation portion 5b are formed and the inclination of the cover 2. Additionally, with respect to an air current 6 at a high flow speed exceeding 10 m/s, turbulence occurs in the flow due to the shape of the cover 2, the shape of the surroundings where the sensor device is installed, and the like, the positions of the ventilation portion 5a and the ventilation portion 5b with respect to a direction of the flow change. In the present embodiment, the performance of the first embodiment and the second embodiment can be further improved in order to reduce air movement in the internal space 4 where a sensor element 3 is installed under the above conditions.

That is, by forming the throttle members 20a and 20b between the ventilation portions 5a and 5b, ventilation resistance between the ventilation portion 5a and the ventilation portion 5b can be increased. As a result, the flow between the ventilation portion 5a and the ventilation portion 5b can be further suppressed.

As the throttle members 20a and 20b, as illustrated in FIG. 11, the throttle members 20a and 20b in which the side face of the internal space 4 where the sensor element 3 is formed are projected so as to narrow the internal space 4 are formed. The throttle members 20a and 20b may be integrally formed with a cover member 2 or a base material 7, or may be formed as separate members.

Figure 12:
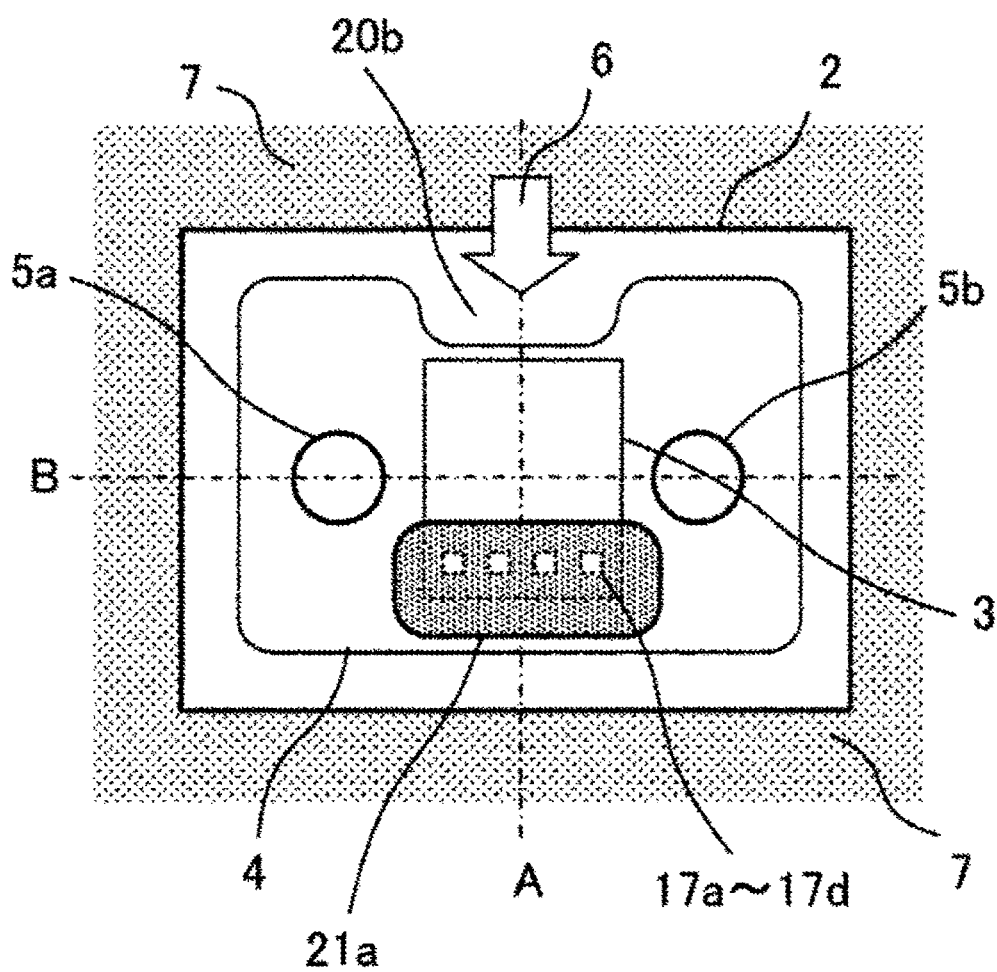
FIG. 12 is a plan view illustrating a structure of the gas sensor device as the one embodiment of the present invention.
Figure 13:
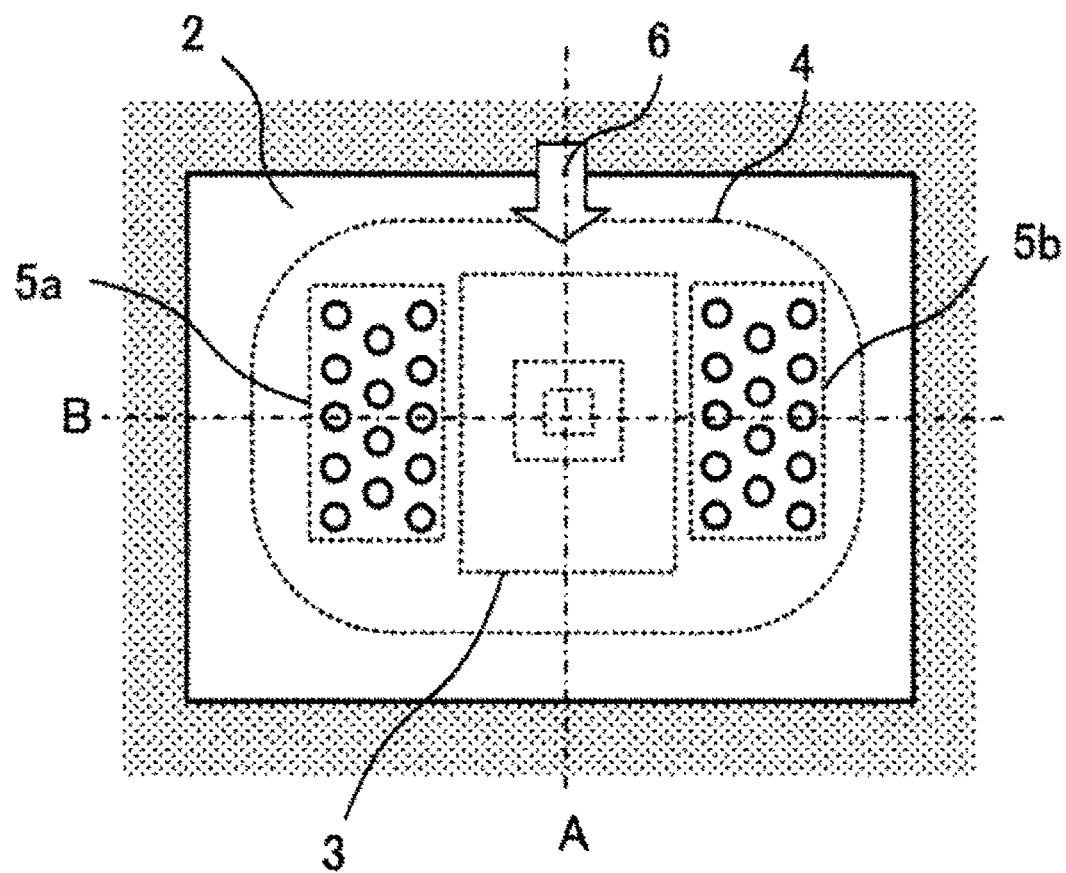
FIG. 13 is a plan view illustrating a ventilation portion structure of the gas sensor device as one embodiment of the present invention.

FIG. 12 is a view illustrating another forming method as a throttle member. The sensor element 3 is provided with electrodes 17a to 17d for connecting with the drive circuit. This electrode is connected to the drive circuit by a bonding wire or the like. In order to protect the electrodes 17a to 17d from corrosion and the like, a protective material 21a is provided on the electrodes 17a to 17d. As the protective material 21a, a resin material such as an epoxy type resin can be mainly used.

The protective material 21a is put on the sensor element 3 so as to cover at least one end of the sensor element 3. With this arrangement, the throttle member 20b is projected into the internal space 4. By forming the protective material 21a between the ventilation portions 5a and 5b, it is possible to increase the ventilation resistance between the ventilation portion 5a and the ventilation portion 5b. As a result, a flow between the ventilation portion 5a and the ventilation portion 5b can be further suppressed. Therefore, it is possible to perform favorable measurement, and it is possible to provide a gas sensor device with improved measurement accuracy.

Fourth Embodiment

FIGS. 13 to 16 illustrate another embodiment of the present invention, illustrating other embodiments of ventilation portions 5a and 5b formed in a cover 2. In the embodiment in FIG. 13, a plurality of ventilation portions 5a and 5b penetrating the outside of the cover 2 and the inside of the cover 2 are provided. The ventilation portion 5a further includes an aggregate of a plurality of ventilation holes. Similarly, the ventilation portion 5b is an aggregate of a plurality of ventilation holes. Since the ventilation portions 5a and 5b are a plurality of fine ventilation holes, the size of a vortex that occurs in each ventilation hole is small, and the turbulence of air in an internal space 4 can be reduced. Additionally, since the ventilation hole is small, steam diffusing from one ventilation hole decreases. However, by making the ventilation portions 5a and 5b a plurality of aggregates, it is possible to increase a ventilation area of the ventilation portion 5a to improve the responsiveness of a humidity change.

Therefore, by making the ventilation portion 5a an aggregate of fine ventilation holes as described above, it is possible to reduce the turbulence of gas in the internal space 4 due to the formation of a vortex and to improve responsiveness to a humidity change.

Figure 14:
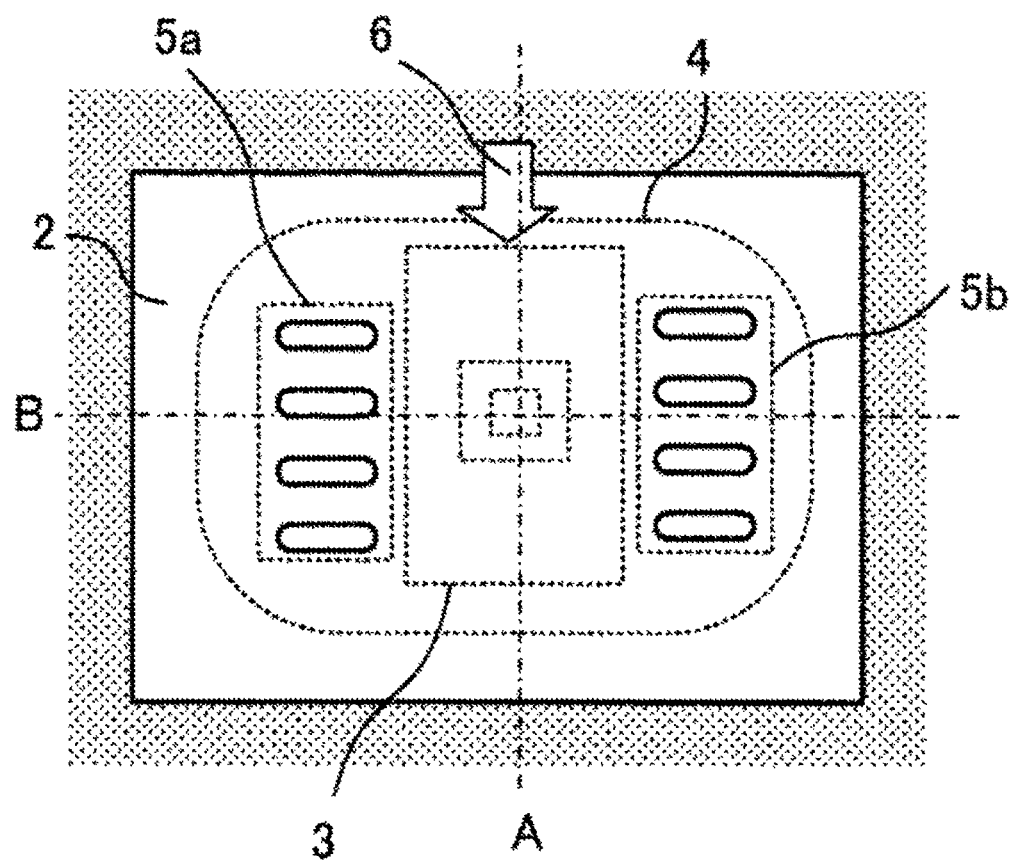
FIG. 14 is a plan view illustrating a ventilation portion structure of the gas sensor device as the one embodiment of the present invention.

In FIG. 14, a plurality of ventilation portions 5a and 5b penetrating the outside of the cover 2 and the inside of the cover 2 are provided. The ventilation portion 5a further includes an aggregate of a plurality of ventilation holes. Each ventilation hole is horizontally elongated in a direction perpendicular to or intersecting a flow direction. The size of the vortex is almost determined by the size of the ventilation hole in the flow direction. Since the size of the ventilation portions 5a and 5b in the flow direction is narrowed, the size of the vortex that occurs in each ventilation hole becomes small.

As a result, the turbulence of air in the internal space 4 can be reduced, and since the ventilation portions 5a and 5b are expanded horizontally, the ventilation area can be enlarged and the responsiveness can be improved. Additionally, by making the ventilation portions 5a and 5b a plurality of aggregates, it is possible to increase the ventilation areas of the ventilation portions 5a and 5b. Therefore, by making the ventilation portion 5a an aggregate of horizontally elongated ventilation holes as described above, it is possible to reduce the turbulence of gas in the internal space 4 due to the formation of a vortex and to improve responsiveness to a humidity change.

Figure 15:
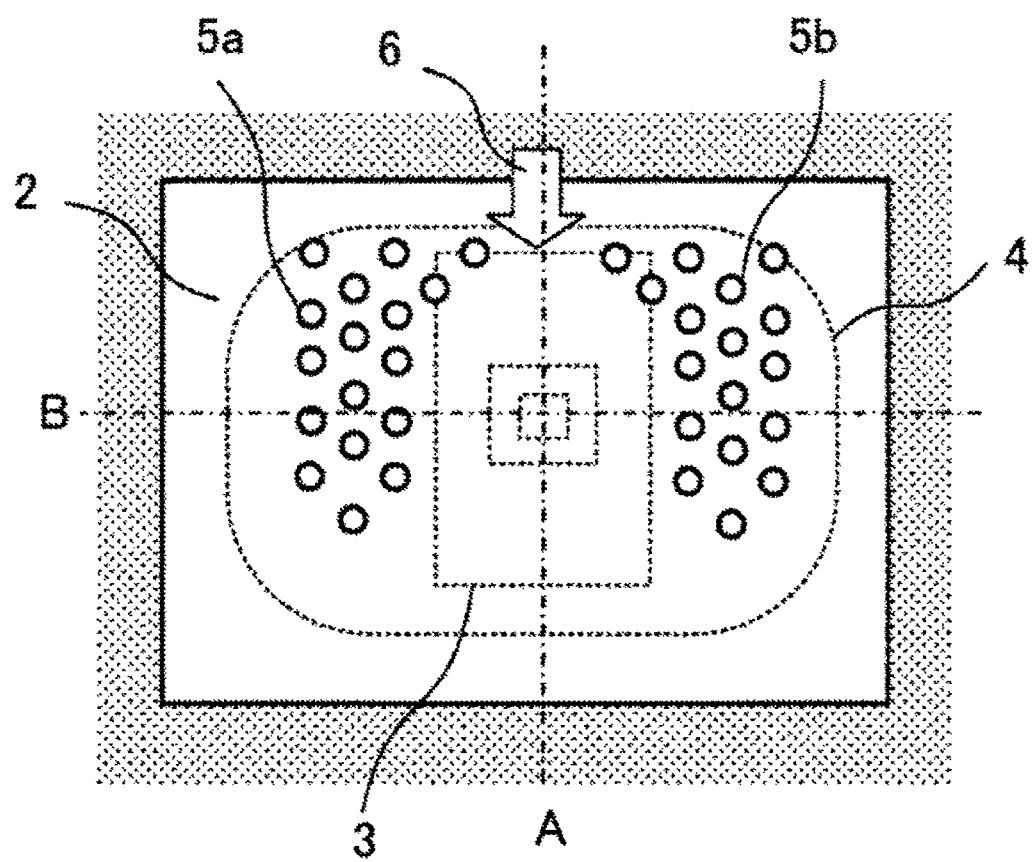
FIG. 15 is a plan view illustrating a ventilation portion structure of the gas sensor device as the one embodiment of the present invention.

In FIG. 15, a plurality of ventilation portions 5a and 5b penetrating the outside of the cover 2 and the inside of the cover 2 are provided. The ventilation portion 5a further includes an aggregate of a plurality of ventilation holes. Similarly, the ventilation portion 5b is an aggregate of a plurality of ventilation holes. The ventilation portions 5a and 5b expands a formation region of the ventilation portions on the upstream side of a flow. Additionally, the formation region is enlarged so that the ventilation portions 5a and 5b approach each other. On the other hand, on the downstream side of the ventilation portions 5a and 5b, the formation region of the ventilation portions is narrowed compared to a sensor element 3. Alternatively, the ventilation holes are arranged while being spaced further from each other.

When the humidity of the air changes, a humidity change occurs on the upstream side faster than on the downstream side. Therefore, by increasing the formation region of the ventilation portions on the upstream side of the sensor element, it is possible to accelerate the humidity change in the internal space 4. On the other hand, since the ventilation area is reduced on the downstream side, the ventilation area as a whole of ventilation portions is maintained. Thus, even if the same ventilation area is provided, by arranging the ventilation portions 5a and 5b near the upstream side of the sensor element, humidity responsiveness can be improved. Additionally, since no ventilation hole is provided on the downstream side of the sensor element 3, a flow from the upstream side of the sensor element 3 in the internal space 4 to the downstream side is suppressed.

Figure 16:
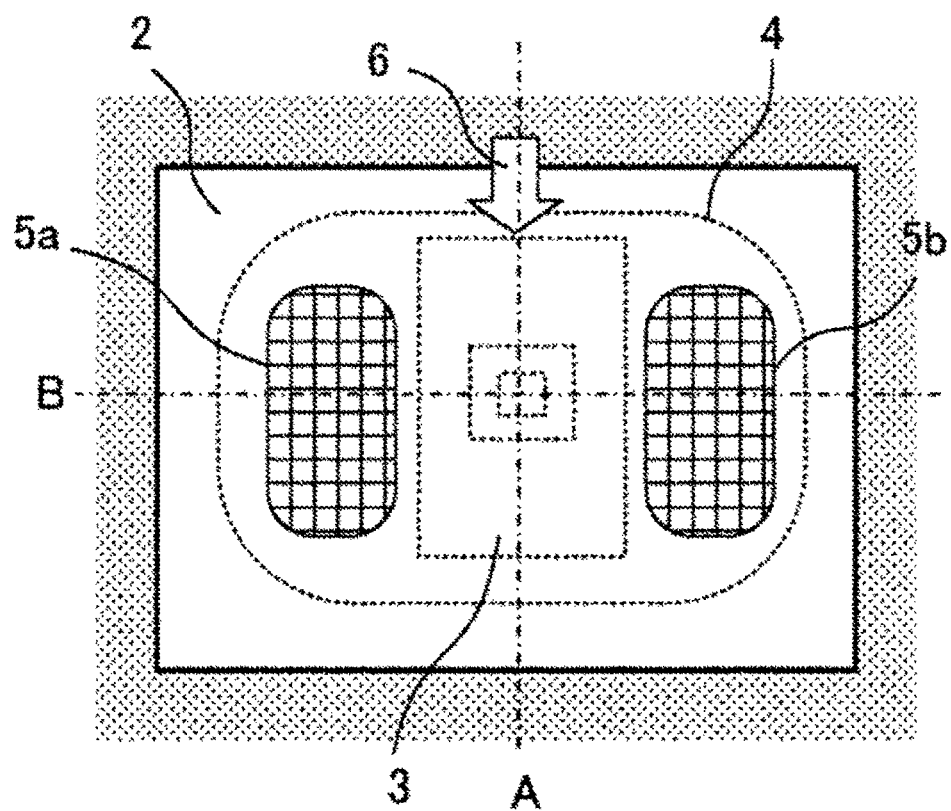
FIG. 16 is a plan view illustrating a ventilation portion structure of the gas sensor device as the one embodiment of the present invention.

In FIG. 16, the plurality of ventilation portions 5a and 5b penetrating the outside of the cover 2 and the inside of the cover 2 are provided. The ventilation portion 5a is covered with a net-like mesh member. By covering the ventilation portion 5a with a mesh member, it is possible to make the ventilation portion 5a an aggregate of a plurality of minute ventilation holes. The same applies to the ventilation portion 5b. Since the ventilation portions 5a and 5b are a plurality of finer ventilation holes, the size of the vortex that occurs in each ventilation hole is further reduced, and the turbulence of air in the internal space 4 can be reduced. It is possible to expand the ventilation portions and it is possible to increase the ventilation area and to improve responsiveness to a humidity change.

Additionally, the ventilation portions in FIGS. 13 to 16 can expand the formation region of the ventilation portion as compared with the first embodiment. Therefore, even if pollutant substances adhere to a part of the ventilation portions, it is possible to maintain air permeability.

In the embodiment of FIGS. 13 to 16, gas to be measured flows through the outside of the cover 2. The surface of the cover 2 in which the ventilation portions 5a and 5b are formed is installed so that the surface is inclined or parallel to a direction in which the gas flows. In other words, the opening direction (penetrating direction) of the ventilation portions 5a and 5b is inclined so that the surface does not face the flow of an air current 6. Furthermore, the positions of the ventilation portions 5a and 5b are formed to be apart from each other in a direction perpendicular to the flowing direction (A line direction) of the air current 6. As a result, it is possible to reduce inflow of pollutant substances that fly at the same time as the air current 6. Additionally, a distance between the ventilation portions 5a and 5b is positioned so as to be larger than the width of the sensor element 3 (width in the B line direction).

Figure 17:
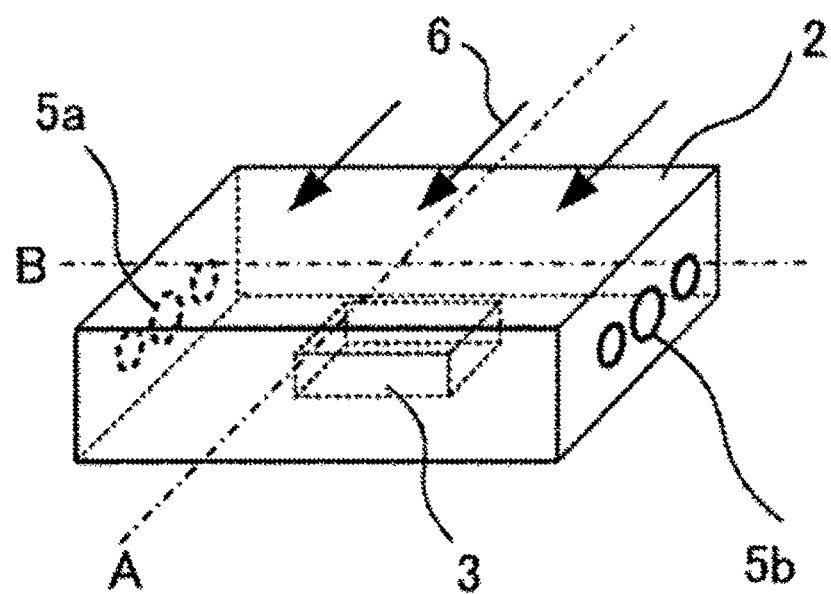
FIG. 17 is a plan view illustrating a cover structure of the gas sensor device as the one embodiment of the present invention.
Figure 18:
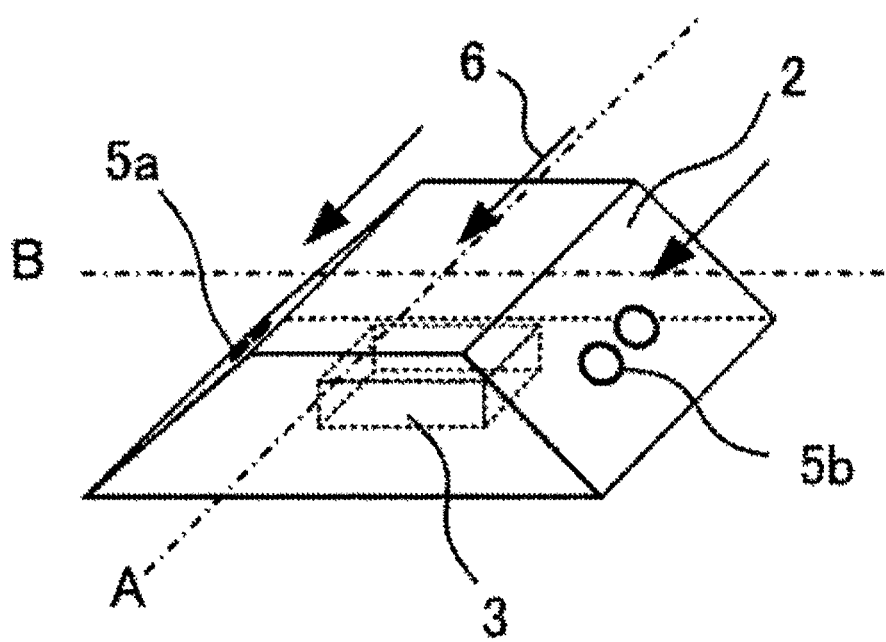
FIG. 18 is a plan view illustrating a cover structure of the gas sensor device as the one embodiment of the present invention.

FIGS. 17 and 18 are other embodiments regarding the arrangement positions of the ventilation portions 5a and 5b and the shape of the cover 2. FIG. 17 is a view illustrating a structure in which the ventilation portions 5a and 5b are arranged on the side surfaces of the cover 2. Additionally, FIG. 18 is a view illustrating a configuration in which the ventilation portions 5a and 5b are arranged in the inclined side surfaces of the cover 2. Even in these cover shapes, the same effect can be obtained by arranging the arrangement positions of the ventilation portions 5a and 5b according to the configuration of the present invention. However, in the present embodiment, since the influence of the inclination of the air current 6 becomes large, it is preferable to provide rectifying members outside the ventilation portions 5a and 5b, and further on the upstream side.

The gas sensor device of the present invention can be applied to internal combustion engines in addition to combustion engines for automobiles. In addition to being applied to the combustion engines, the gas sensor device of the present invention can be applied to cases of measuring gas concentrations in various environments.

Each embodiment described above is merely exemplified as a preferred embodiment. The embodiments described above can be appropriately combined, and also can be appropriately modified on the basis of the gist of the invention.

REFERENCE SIGNS LIST 1 gas sensor device
2 cover
3 sensor element
4 internal space
5a, 5b ventilation portion
6 air current
7 base material
8 internal flow
9 detection portion
10 space on element
11 substrate
12 hollow portion
13 first heating element
14 second heating element
15 thin film support
16a, 16b insulating layer
17a to 17d electrode
18a to 18c guide member
19a, 19b shielding member
20a, 20b throttle member
21 protective material

The invention claimed is:

1. A gas sensor device comprising:
   a sensor element that detects a concentration of gas by heat dissipation of a heating element;
   a cover that covers the sensor element, wherein
     the cover has a plurality of ventilation portions,
     the plurality of ventilation portions are arranged while being apart from each other in a direction perpendicular to a flow direction of the gas,
     the sensor element is arranged at a position opposing an inner surface of the cover, the inner surface is arranged between the plurality of ventilation portions,
     a gap between the sensor element and the inner surface of the cover is smaller than a height of an inner space covered by the cover, and
   a guide member that rectifies a flow direction of the cover surface in which the plurality of ventilation portions are formed; and
   throttle members which are disposed between the plurality of ventilation portions, to thereby increase ventilation resistance between the plurality of ventilation portion, and to suppress flow between the plurality of ventilation portions, wherein
     a shape of the guide member is a passage structure formed by additional guide members and a plurality of shielding members, which penetrate in the flow direction.

2. The gas sensor device according to claim 1, wherein a distance between the sensor element and the cover is narrower than a size of the ventilation portion.

3. The gas sensor device according to claim 2, wherein a perpendicular distance of the ventilation portion is larger than a flow direction diameter of the ventilation portion, the height of the inner space is larger than the diameter of the ventilation portion, and
   the diameter of the ventilation portion is larger than the gap between the sensor element and the inner surface of a corner.

4. The gas sensor device according to claim 1, wherein a rectifying member that rectifies a flow of gas is provided outside the cover.

5. The gas sensor device according to claim 1, wherein a throttle portion is provided in an internal space between the plurality of ventilation portions.

6. The gas sensor device according to claim 1, wherein the plurality of ventilation portions each further includes an aggregate of a plurality of ventilation holes.

7. The gas sensor device according to claim 6, wherein the plurality of ventilation portions each further includes an aggregate of a plurality of ventilation holes, and
   one or more ventilation holes constituting the ventilation portions are horizontally elongated in a direction perpendicular to or intersecting a flow direction.

8. The gas sensor device according to claim 7, wherein an opening area on an upstream side of the plurality of ventilation portions is more expanded than an opening area on a downstream side of the plurality of ventilation portions.

9. The gas sensor device according to claim 1, further comprising a net-like mesh member covering the plurality of ventilation portions.

10. The gas sensor device according to claim 1, wherein the substrate is formed of single crystal silicon, a hollow portion is formed in the substrate, and the heating element and a second heating element are disposed in the hollow portion.

* * * * *